United States Patent [19]
Hogan

[11] 3,865,491
[45] Feb. 11, 1975

[54] SURVEYING INSTRUMENT TRACKING SYSTEM

[75] Inventor: William M. Hogan, North Little Rock, Ark.

[73] Assignee: Blount & George, Inc., Jacksonville, Ark.

[22] Filed: Feb. 4, 1974

[21] Appl. No.: 439,585

Related U.S. Application Data

[63] Continuation-in-part of Ser. No. 181,839, Sept. 20, 1971.

[52] U.S. Cl. .................... 356/152, 356/4, 356/141, 356/172
[51] Int. Cl. ........................................... G01b 11/26
[58] Field of Search .............. 356/4, 141, 152, 172; 250/203 R; 172/4.5

[56] References Cited
UNITED STATES PATENTS

| | | | |
|---|---|---|---|
| 2,982,859 | 5/1961 | Steinbrecher | 250/203 R |
| 3,511,998 | 5/1970 | Smokler | 250/203 R |
| 3,514,608 | 5/1970 | Whetter | 356/4 |
| 3,588,249 | 6/1968 | Studebaker | 356/4 |
| 3,671,126 | 6/1972 | Erb | 356/4 |
| 3,680,958 | 8/1972 | Von Bose | 356/5 |

Primary Examiner—Maynard R. Wilbur
Assistant Examiner—S. C. Buczinski
Attorney, Agent, or Firm—Richards, Harris & Medlock

[57] ABSTRACT

The specification discloses an automatic elevation surveying system which includes a pivotal housing mounted on a support pedestal. The support pedestal includes a vertically disposed member attached thereto and supporting a laser beam source for projecting a laser beam in a vertical direction parallel to the axis of the member. A pentaprism is mounted within the pivotal housing, with the input face of the pentaprism normal to the laser beam, whereby rotation of the pentaprism generates a laser beam in a plane perpendicular to the original laser beam. The housing also includes an infrared detector system mounted therein. A portable beacon which emits infrared waves is adapted to be attached to a surveying stadia rod or to earth moving equipment or the like. The infrared detector system detects the position of the beacon and operates a motor to pivot the housing such that the laser beam is continuously maintained in alignment with the stadia rod. If the infrared detector system does not detect infrared waves, circuitry is provided to continuously cycle the housing to provide a continuously sweeping laser beam.

11 Claims, 10 Drawing Figures

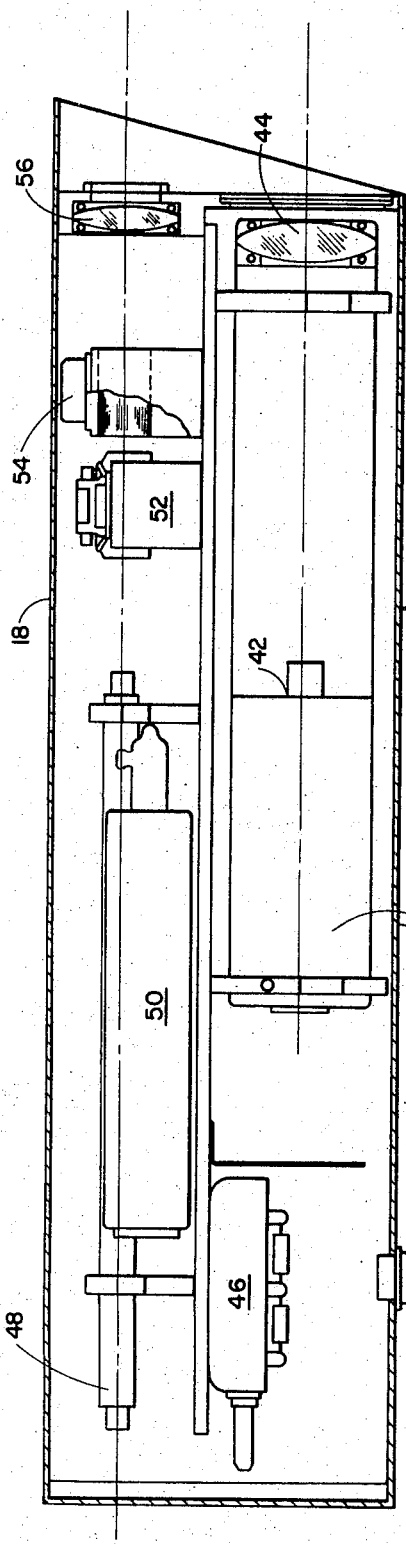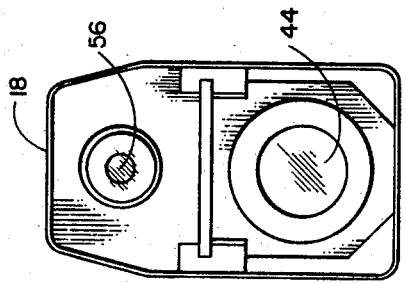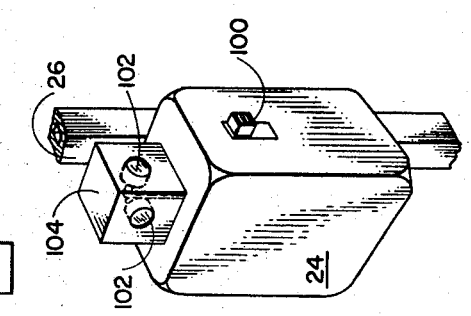

3,865,491

SURVEYING INSTRUMENT TRACKING SYSTEM

RELATED APPLICATION

This application is a continuation-in-part of an application Ser. No. 181,839, filed Sept. 20, 1971, entitled *OPTICAL INSTRUMENT TRACKING SYSTEM.*

FIELD OF THE INVENTION

This invention relates to precision optical instrument systems, and more particularly relates to a surveying system utilizing a coherent beam of light which is automatically positioned in response to the reception of electromagnetic waves of a predetermined frequency.

THE PRIOR ART

It is often necessary to accurately position an optical instrument such as a telescope, a television camera, a range finder, a laser or the like. Generally, human intervention has been heretofore required to align such optical instruments with a desired target. Human operation of optical instruments is not only expensive, but is sometimes subject to inaccuracies and errors, especially in the case of a moving target.

Specifically, in surveying operations it has heretofore been known to direct a laser beam upon a surveying stadia rod or similar target. In some systems, an operator is required at the laser support to continuously position the laser beam so as to impinge upon the stadia rod. In other systems, the laser beam is continuously rotated about a horizontal plane in order to periodically impinge upon a stadia rod or another measuring target. Examples of such continuously rotating laser beam devices are found in U.S. Pat. No. 3,462,845, issued Aug. 26, 1969, and U.S. Pat. No. 3,471,234, issued Oct. 7, 1969. Both the human-operated and continuously rotated laser beam surveying systems have generally not been satisfactory with respect to accuracy, operating procedures and expense.

SUMMARY OF THE INVENTION

In accordance with the present invention, a system is provided which automatically aligns an optical instrument with a desired target without human intervention. The optical instrument is pivotally mounted upon a support, with a detector being provided to generate output signals upon the detection of predetermined electromagnetic waves. Structure is provided to pivot the optical instrument in dependence upon the output signals from the detector. A beacon is provided to generate predetermined electromagnetic waves such that the optical instrument is continuously maintained in alignment with the beacon.

In accordance with another aspect of the invention, an automated surveying system includes an optical instrument such as a light emitting device mounted for pivotal movement. A tracking detector is provided for detecting electromagnetic waves within a predetermined frequency range. Structure is responsive to the tracking detector for pivoting the light emitting device toward the source of the electromagnetic waves.

In accordance with a more specific aspect of the invention, an automated surveying system includes a support pedestal. A pivotal housing is mounted on the support pedestal and includes a laser mounted therein. An infrared wave detector system is mounted in the housing. A motor is responsive to the output of the infrared wave detector for pivoting the housing. A portable beacon is operable to emit infrared waves such that a laser is continuously maintained in alignment with the beacon. If the source of infrared waves is interrupted, structure is provided to continuously cycle the housing until the infrared waves are again detected.

In accordance with another embodiment of the invention, an automatic elevation surveying system includes a support pedestal having a vertically disposed tubular member attached thereto with a laser beam source positioned within the member. The laser beam source projects a laser beam in a vertical direction parallel to the axis of the tubular member. A pivotal housing is mounted on the support pedestal. A pentaprism is mounted within the housing such that the input face of the pentaprism is normal to the laser beam, whereby rotation of the pentaprism generates a laser beam in a plane perpendicular to the original laser beam. A beacon is attached to a movable target and is operable to emit infrared waves. An infrared wave detector is mounted in the housing. A motor is provided for rotating the housing and is responsive to the output of the detector for pivoting the housing toward the beacon such that the laser beam is continuously aligned with the movable target.

DESCRIPTION OF THE DRAWINGS

For a more complete understanding of the present invention and for further objects and advantages thereof, reference is now made to the following description taken in conjunction with the accompanying drawings, in which:

FIG. 3 is a longitudinal section of the upper housing of the system shown in FIG. 1;

FIG. 4 is a front view of the upper housing shown in FIG. 3;

FIG. 7 is a perspective view of the infrared beacon shown in FIG. 1;

DESCRIPTION OF THE PREFERRED EMBODIMENT

Figure 1:
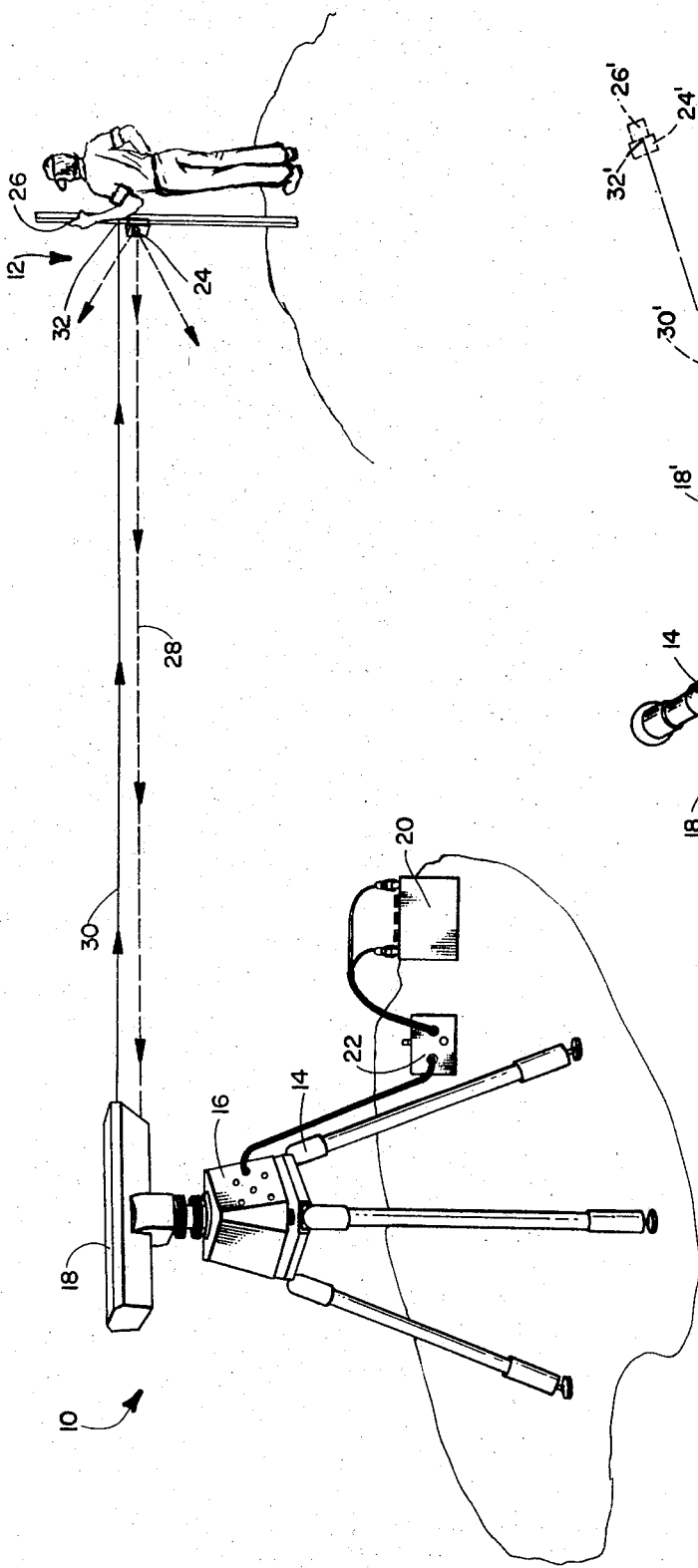
FIG. 1 is a somewhat diagrammatic perspective view of the automated surveying system of the present invention.

Referring to FIG. 1, the present system is illustrated as comprising the automatic optical instrument tracker 10 and an infrared beacon assembly 12. The tracker 10 comprises a tripod 14 which enables setup of the system on uneven terrain at a convenient working height. A control housing 16 contains control circuitry and a servomotor for pivoting an optical instrument and infrared detector housing 18. Housing 18 is rotatably mounted on the upper portion of housing 16 so as to be rotatable in a horizontal plane. A battery 20 supplies electrical power to a power supply 22 for operation of the electrical circuitry and the servomotor within the housing 16.

An infrared wave emitting beacon 24 is suitably attached by clamps or the like to a conventional Philadelphia stadia rod 26. In surveying operations, rod 26 is positioned in different locations by an operator in the well-known manner. The beacon 24 emits electromagnetic waves within a predetermined frequency range, which in the preferred embodiment is the infrared range. The infrared waves are denoted in the drawing generally by the dotted line 28 and are detected by an infrared detector located within the housing 18. The infrared detector generates electrical signals representative of the position of the beacon 24, the electrical signals controlling the operation of the servomotor within housing 16 in order to accurately position the housing 18. The housing 18 contains an optical instrument which in the preferred embodiment comprises a coherent light source such as a laser which directs a narrow light beam 30 upon the stadia rod 26. A small dot of light 32 thus appears upon the stadia rod 26 to enable determination of the desired elevation height in the well-known manner. It will be understood that other optical instruments such as a range finder or the like could be contained in housing 18 in place of or in combination with the laser.

Although the invention is disclosed in the preferred embodiment as being used in conjunction with surveying operations involving a stadia rod, it should be understood that the system may also be used for other surveying applications. For example, the beacon 24 can be mounted on the movable blade of an earth moving machine and the light beam 30 sensed at the machine and utilized to control the position of the blade. The system may also be utilized in a wide variety of operations for establishing grade elevations and the like, and the term "surveying" is thus to be used broadly in this application to encompass all such operations.

Figure 2:
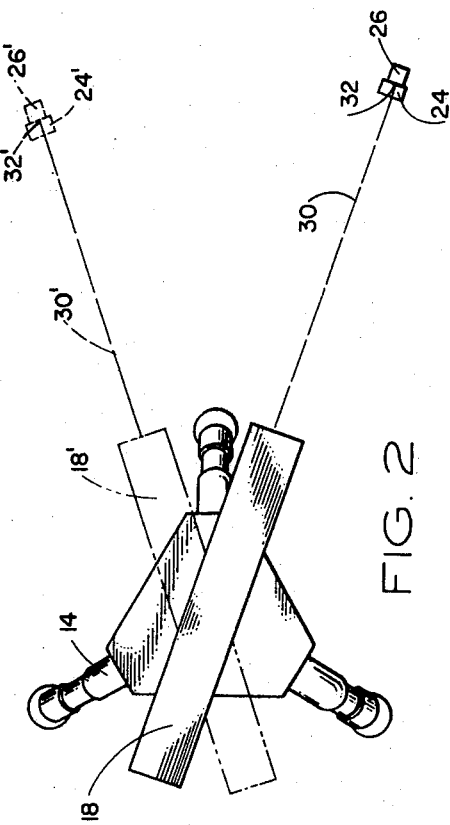
FIG. 2 is a top view illustrating pivotal movement between various positions of the automated surveying system shown in FIG. 1.

FIG. 2 illustrates operation of the system as the operator moves the stadia rod 26 from one position to another during surveying operations. In the initial placement of the stadia rod 26, the housing 18 is aligned such that the laser beam 30 directs a spot 32 against the rod. When the rod is then moved by the operator to the position illustrated by 26', the housing 18 is moved to the position denoted as 18' to thereby direct the laser beam along the path 30' for impingement upon the rod. In the operation of the present system, only a single man is required for conventional surveying operations, in place of the two or three-man crews required by many conventional surveying systems. As will be later described, in case the operator or another body inadvertently moves between the housing 18 and the beacon 24, the system cycles the housing 18 in a complete search circle until the system again locks onto the infrared beam emitted from the beacon 24.

FIG. 3 illustrates a longitudinal section of the housing 18. A chamber 40 mounted within the housing 18 contains a plurality of printed circuit boards, not shown, which provide electrical control functions for the infrared wave detection system. A pair of spaced apart infrared detectors 42 are mounted on the front of the chamber 40 to receive infrared waves transmitted through a compound lens system 44 mounted in the front of the housing 18. A power supply 46 is located in the rear of the housing 18 to provide voltage conversion for operation of the laser. A laser 48 is mounted in the housing 18 along with a discharge tube 50. Laser 48 may comprise any one of a plurality of commercially available laser systems. The laser directs a coherent beam of light through an optical compensator 52 which maintains a constant level line of sight for the system. The laser beam is then directed through a circular level bubble device 54 and through a laser objective lens system 56. FIG. 4 illustrates the relative positioning of the infrared detector lens 44 and the laser objective lens 56.

Figure 5:
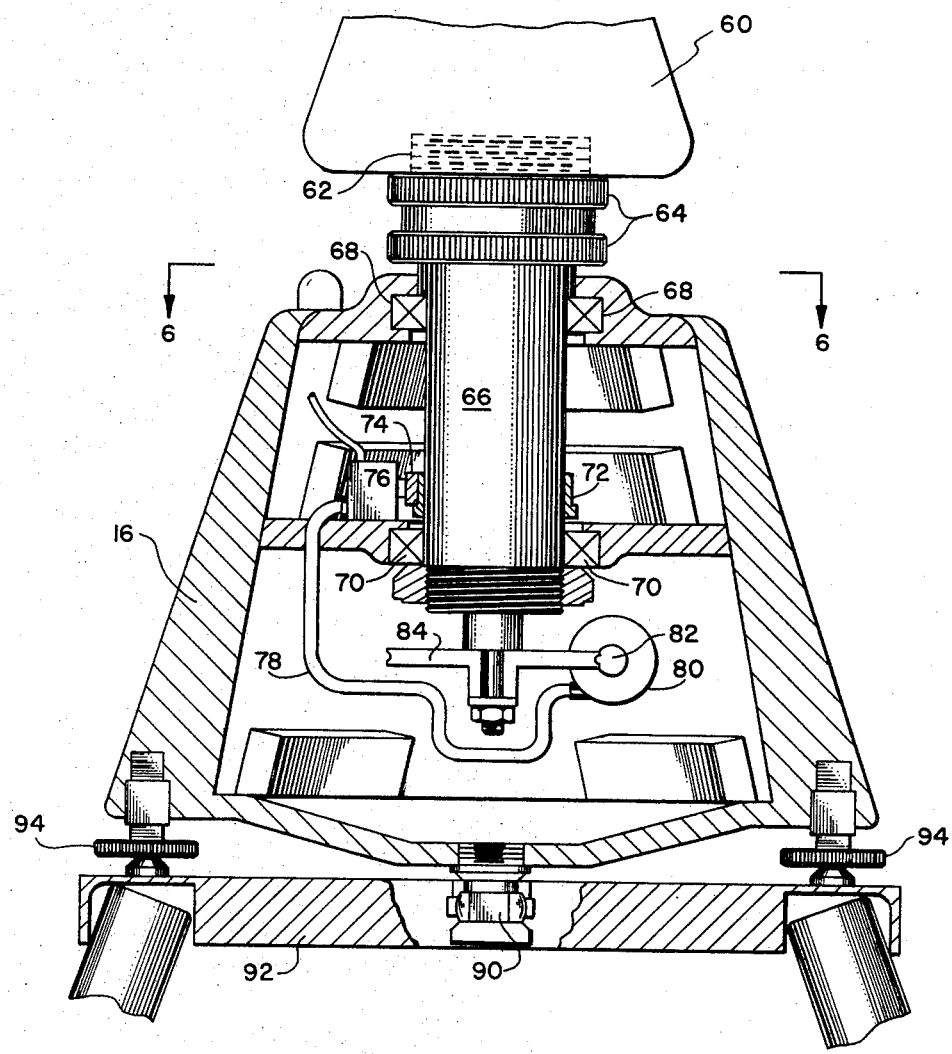
FIG. 5 is a longitudinal section of the upper pedestal portion of the system shown in FIG. 1.

FIG. 5 is a longitudinal sectional view through the housing 16. A neck member 60 supports the housing 18 in the manner previously shown and is threadedly connected to the upper end of a shaft 62. A pair of lock nuts 64 are provided to enable vertical height adjustment of the housing 18. A hollow shaft 66 is rigidly connected through the lock nuts 64 and shaft 62 to the neck member 60 in order to provide rotation to the housing 18. Shaft 66 is journaled in bearings 68 and 70. A conductive ring 72 is mounted about the shaft 66 for contact with a slip ring commutator assembly 74. A brush block 76 supports the assembly 74. Electrical control signals are applied via wires 78 to a servomotor 80. Control signals are supplied to housing 18 by wires, not shown, which are disposed through the shaft 66 and are connected to the ring 72. The control signals are generated by the infrared wave detection circuitry in the manner to be subsequently described. Operation of the servomotor 80 rotates an output shaft connected to a worm gear 82 which meshes with a circular gear 84. Rotation of gear 84 causes rotation of the shaft 66 to thereby rotate the housing 18 and align the laser beam. The housing 16 is mounted in a swivel joint 90 within a base plate 92 connected to the tripod legs. Levelling screws 94 enable the optical instrument to be levelled prior to use.

Figure 6:
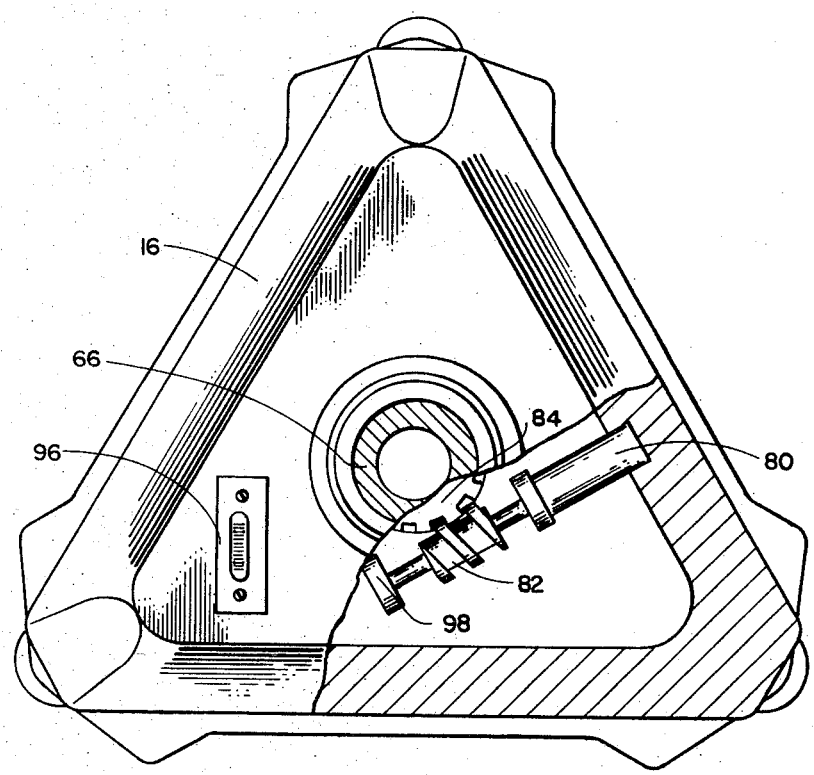
FIG. 6 is a sectional view, partially broken away, taken along section lines 6—6 in FIG. 5.

FIG. 6 illustrates a sectional view taken generally along the section lines 6—6 in FIG. 5. The shaft 66 is shown extending upwardly from the housing 16. A bubble level 96 is provided to enable visual levelling of the housing 18 by operation of the levelling screws 94. The housing 16 is cut away to show the servomotor 80, with the worm gear 82 shown meshing with the circular gear 84 in order to rotate the shaft 66. The end of the output shaft of the servomotor 80 is journaled in a bearing 98.

FIG. 7 illustrates a perspective view of the infrared wave emitting beacon 24. A switch 100 enables on-off operation of the beacon to conserve power. Batteries, not shown, are included within the beacon 24 to supply power to three infrared emitting diodes 102 mounted in the quadrants of an upper housing 104. Energization of the diodes 102 causes beams of infrared energy to be directed from the beacon 24. In the preferred embodiment, infrared energy in the range of 9000 Angstroms has been found to work well in practice. The infrared energy is directed in a relatively narrow conical beam to provide extreme accuracy of operation of the remote infrared detecting system. Beacon 24 may be suitably connected to the stadia rod 26 by clamps, straps or the like.

Figure 8:
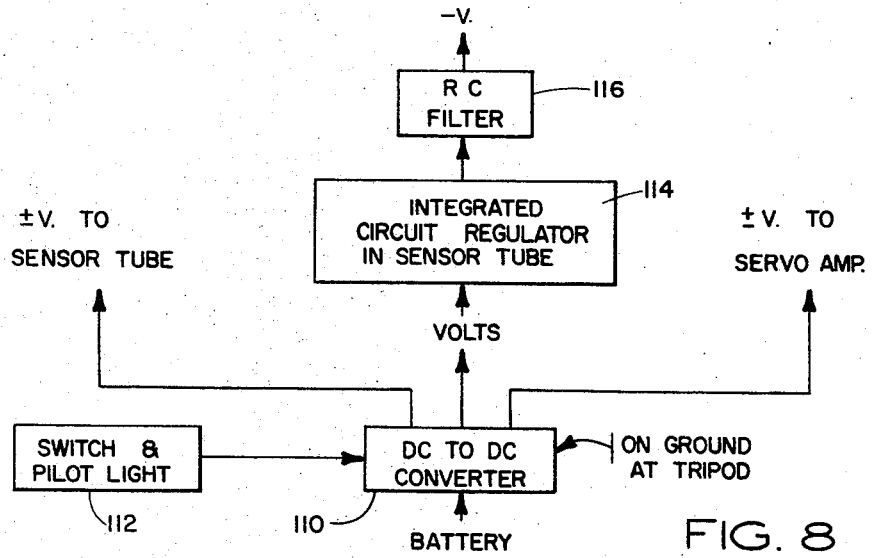
FIG. 8 is a block diagram of the power supply for the system shown in FIG. 1.

FIG. 8 illustrates a block diagram of the power supply 22 for the tripod-mounted system shown in FIG. 1. Power from a conventional automobile battery is applied through a DC to DC converter 110 to provide a plurality of output DC voltages. A switch 112 is provided to turn the system on, with a pilot light being provided to indicate when the system is energized. An integrated circuit regulator 114 is disposed within the sensor chamber 40 and provides voltage regulation for one of the voltage outputs of the converter 110. The output from the regulator 114 is filtered by an RC filter 116 to remove noise and the like. The remaining voltages from converter 110 are applied to the sensor tube and to the servo amplifier circuit.

Figure 9:
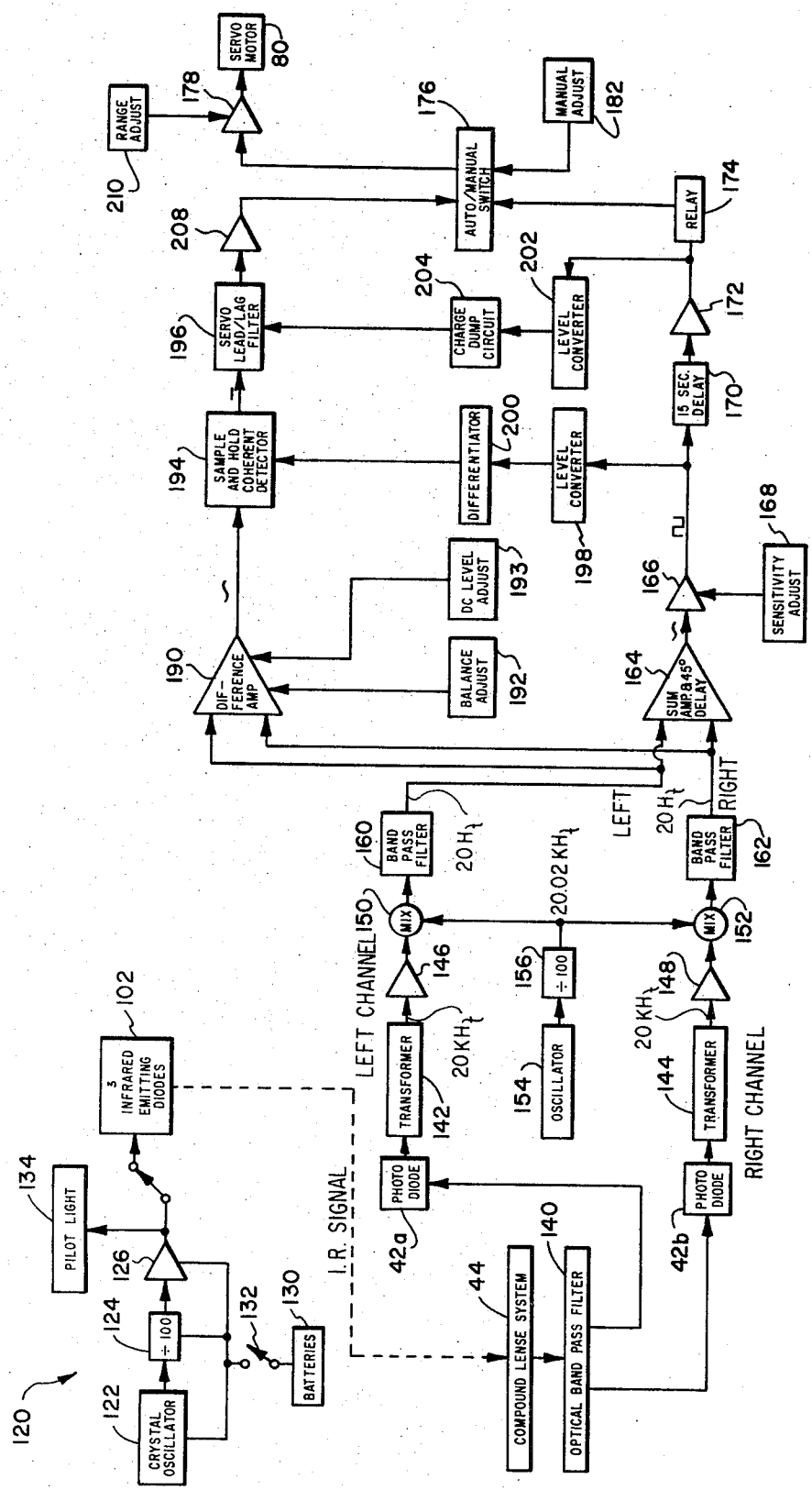
FIG. 9 is a block diagram of the electrical control circuitry of the present system.

FIG. 9 illustrates a block diagram of the beacon, detector and servo systems. The beacon circuitry is identified generally by the numeral 120 and comprises a 2MHz crystal oscillator 122 which provides a reference frequency which is passed through a divider circuit 124. The divider circuit comprises a pair of standard decade logic dividers to divide the output of the oscillator 122 by 100. The output of the divider is applied to an amplifier 126 which drives the three infrared light emitting diodes 102. Voltage supply for the beacon circuitry is provided by batteries 130. An on-off switch 132 enables conservation of the batteries. In some instances, it will be desired to provide a voltage step-up circuit for the output of the batteries 130.

When the beacon is turned on, a red light emitting diode pilot light 134 is energized. While it will be understood that any infrared wave emitting source which provides an adequate range and directivity may be utilized with the invention, in an embodiment which worked well, three Model No. TI27 light emitting diodes manufactured and sold by Texas Instruments, Inc. were utilized. Each of these diodes provided approximately a 135° radiation pattern at a wave length of approximately 935 nanometers. The diodes provided an effective range up to approximately 800 feet. The utilization of three light emitting diodes enables effective operation of the system even though the stadia rod 26 may be twisted in various directions during use.

The infrared signal from the beacon passes through the compound lens system 44 previously described. In the preferred embodiment, the lens comprises a conventional bi-convex lens for focusing the infrared signals. The signals are then passed through an optical band pass filter 140 which passes only infrared signals having wave lengths of 900 nanometers or longer in order to filter out the visible light. In the preferred embodiment, an IRTRAN filter was utilized. The filtered infrared signals are then applied to a pair of infrared detectors 42a–b in the manner previously described.

The detectors may comprise, for instance, the Pin Spot 2D detector package manufactured and sold by United Detector Technology Company, which includes two matched silicon detector elements spaced approximately 5 mils apart. The output from detector 42a is termed the left channel and is applied through a field effect transistor impedance transformer 142. The output from the photo-diode detector 42b is termed the right channel and is applied through a field effect transistor impedance transformer 144. The transformers 142 and 144 comprise FET devices connected in an emitter follower configuration to provide a high impedance to the detectors. The resulting 20KHz signals from the transformers are applied through low noise, high pass filter amplifiers 146 and 148 respectively. Amplifiers 146 and 148 comprise conventional integrated circuits to provide filtering of low frequency noise. The amplifiers include small coupling capacitors between the output of the transformers 142 and 144 and the input to the amplifiers.

The outputs of the amplifiers 146 and 148 are mixed at mixing circuits 150 and 152, respectively, with a 20.02KHz signal supplied from a crystal oscillator 154 and a x100 divider 156. The mixing circuits 150 and 152 comprise two transistor true product circuits which provide output signals centered around 20Hz. The signals are respectively passed through active band pass filters 160 and 162 for filtering of noise from the mixing action. The filters comprise twofold integrated circuit devices tuned to approximatly 20 cycles per second bandpass. The 20Hz output signals from the filters 160 and 162 are both applied to a summing amplifier and 45° delay circuit 164. Circuit 164 is an operational amplifier which sums the left and right channel outputs and also includes a capacitive feedback path to provide a 45° lag to the summed signals.

The summed output is fed through a zero crossing detector 166 which squares the output signal. The detector 166 comprises an overdriven amplifier which is controlled by voltage applied from a sensitivity adjust circuit 168. The output from the zero crossing detector 166 is applied through a 15 second delay circuit 170 to an amplifier 172. Delay 170 includes a rectifier and an RC network discharging into the transistor amplifier 172. The purpose for the delay 170 is to prevent the system from switching into the search mode in case of only a temporary interruption of the infrared beam from the beacon. The output from the amplifier 172 is applied to a relay circuit 174 which controls the switching of the circuit to either the "search" or "on signal" mode. The relay circuit 174 is applied through the auto/manual position switch 176 to the servo amplifier 178 which operates the servomotor 80. A manual position adjust circuit 182 comprises a potentiometer which may be manually operated to control the position of the laser beam in a manner to be subsequently described.

The left and right channel outputs from filters 160 and 162 are also applied to a difference amplifier 190 which generates a signal having a polarity dependent upon the difference to amplitude between the signals sensed by the detectors 42a and 42b. The difference amplifier 190 is controlled by a channel amplitude balance adjust 192 and an average DC level adjust 193 which enable adjustment of the output of amplifier 190 to zero when both of the detectors sense equal signals. The output of the difference amplifier 190 is applied to a sample and hold coherent detector 194 which comprises an FET acting as a switch. The output of the circuit is capacitively connected to ground to act as a sample and hold circuit. The detector 194 provides smoothing to the difference signal and the output thereof is applied to a servo lead/lag filter 196.

The output of the zero crossing detector 166 is also applied through a level converter 198 to a differentiator 200. The level converter 198 converts the DC level upwardly to the desired level. The output of the differentiator 200 is applied to the sample and hold coherent detector 194. The 45° delay provided by the delay 164 and the differentiator 200 operate to narrow the sampling period of the detector 194 to a suitable interval. The output of the amplifier 172 is further applied to a level converter 202 for driving a charge dump circuit 204, the output of which is applied to the filter 196. The charge dump circuit 204 prevents stray charge from building up in the circuit during the search mode, so that the system operates only when a valid signal is received.

The output of the filter 196 is applied through a buffer amplifier 208 to the auto/manual position switch 176. The range of the servo amplifier 178 may be controlled by a range adjust 210 in order to provide compensation to the servomotor for different beacon ranges.

The relay circuit 174 determines whether the system is placed in the "search" or "on signal" mode. When the switch 176 is switched into the auto mode and operation of the system is initiated, the relay circuit 174 feeds a reference voltage through the switch 176 to the servo amplifier 178. The reference voltage is derived from a potentiometer, not shown, and acts as a reference search voltage to operate the servometer to continuously turn the housing 18 during the search mode. When the system detects a valid infrared beam from the beacon, an error signal is developed from the detector 194 and the relay circuit 174 switches the system such that the servo amplifier 178 receives the error voltage for automatic acquisition of the target. The charge dump circuit 204 is turned off at this point such that the error voltage can be transmitted through the lead/lag filter 196 to operate the servomotor system.

When the auto/manual switch 176 is switched to the manual operation position, the manual position adjust potentiometer 182 may be manually turned to position the housing 18 in the desired position. When the switch 176 is in the manual position, all other portions of the system are disconnected from the servomotor system.

Figure 10:
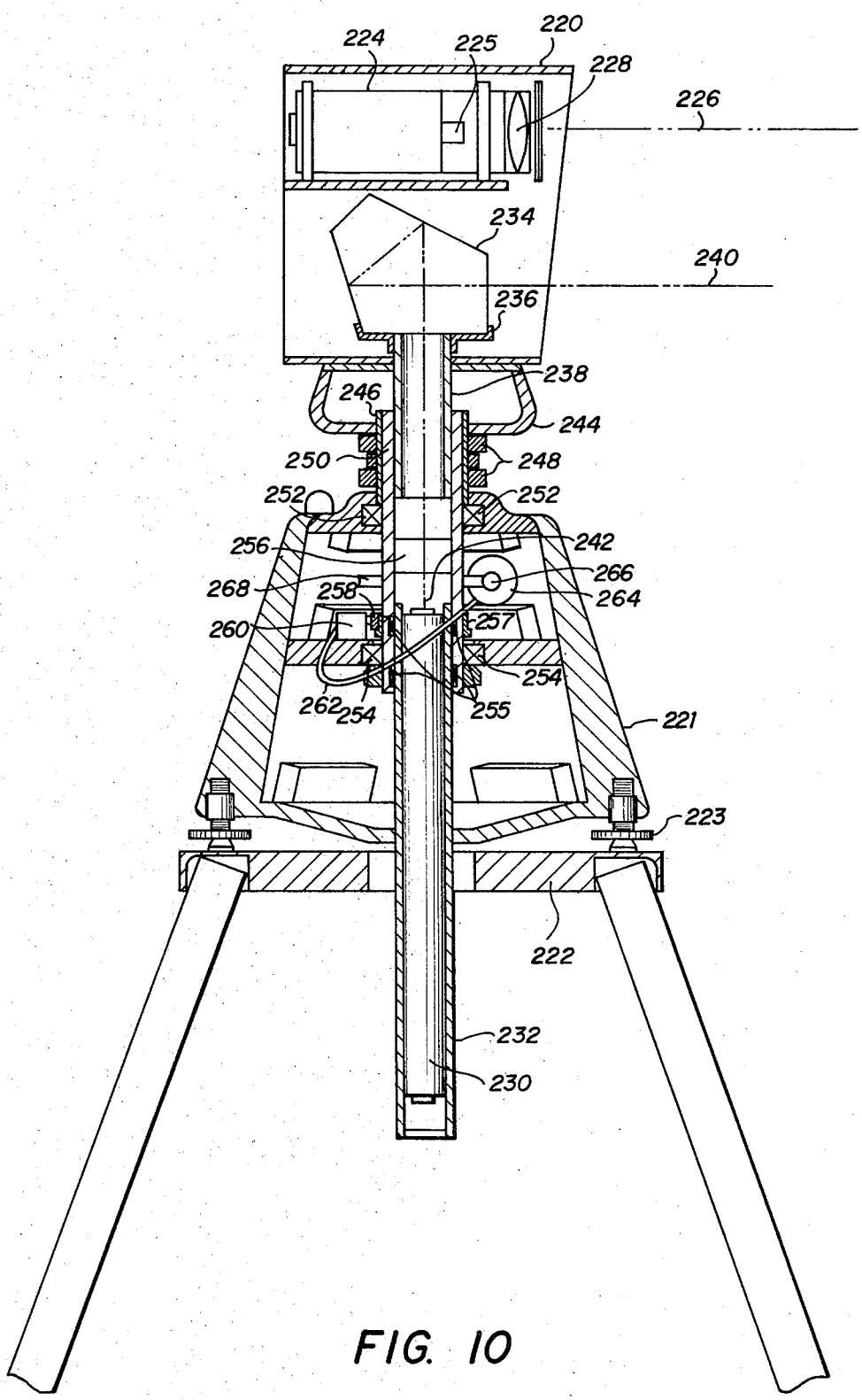
FIG. 10 illustrates a sectional view of the automatic surveying system using a rotating pentaprism to project a reference beam.

FIG. 10 illustrates another embodiment of the invention. Rotatable housing 220 is supported by a pedestal housing 221 which is in turn attached to base plate 222 through levelling screws 223. A chamber 224 mounted within housing 220 contains a plurality of printed circuit cards (not shown) which provide electrical control functions for the infrared wave detection system in the manner previously described. A pair of spaced apart infrared detectors 225 are mounted on the front of chamber 224 to receive infrared waves 226 transmitted through a compound lens system 228 mounted in the front of housing 220.

A laser source 230 is mounted in a stationary tubular member 232 extending below housings 220 and 221 and supported by attachement to the base of pedestal housing 221. Laser 230 may comprise any one of a plurality of commercially available laser systems. The laser directs a coherent light beam of light upwardly along an axis parallel to the axis of tubular member 232. An optical device 234 is rigidly mounted on seat member 236 which is in turn fixed to a housing 220 by hollow tube 238. Device 234 comprises a generally pentagonally shaped prism commonly known as "pentaprism" and has the optical characteristic that any beam of radiation that is incident on one of the prism faces will be emitted at exactly 90° to the incident beam. Thus, as the prism 234 is rotated or oscillated about the axis of tube 238, a single beam 240 will be produced establishing a reference plane exactly perpendicular to the originally emitted beam 242.

A neck member 244 supports the housing 220 and is threadedly connected to the upper end of shaft 246. A pair of lock nuts 248 are provided to enable vertical height adjustment of the housing 220. A hollow shaft 250 is rigidly connected through the lock nut 248 and shaft 246 to the neck member 244 in order to provide rotation to the housing 220. Shaft 250 is journaled in bearing 252 and 254. Rotation of shaft 250 relative to tubular member 232 is provided by bearings 255 seated in shaft 250. Attachable within shaft 250 and in the line of passage of beam 242 is a two axis self-levelling compensator 256. When employed, levelling compensator 256 assures the maintenance of the laser beam at a fixed angle during rotation.

A conductive ring 257 is mounted about the shaft 250 for contact with a slip ring commutator assembly 258. A brush block 260 supports the assembly 258. Electrical control signals are applied by way of wires 262 to a servomotor 264. Control signals are applied to housing 224 by wires (not shown) which are disposed through the shaft 250 and 238 and are connected to the ring 257. Control signals are generated by the infrared wave detection circuitry in the manner previously described. Operation of the servomotor 264 rotates an output shaft connected to a worm gear 266 which meshes with the circular gear 268. Rotation of gear 268 causes rotation of the shaft 250 to thereby rotate the housing 220 and align the laser beam with the infrared wave source.

In operation, the present invention may function in one of two possible modes. In the first mode, infrared waves, denoted in the drawing generally by the dotted line 226, are generated by a beacon in the manner previously described, and are detected by the pair of infrared detectors 225 located within the housing 220. The infrared detectors generate electrical signals which control the operation of the servomotor 264 which by its action on gear 268 aligns housing 220 with the source of the infrared waves. In this way, laser beam 240 deflected from prism 234 continuously tracks the source of the infrared waves, thereby furnishing a reference beam at that location.

In the second mode of operation, the surveying system may be used without a beacon emitting infrared waves. As previously described, when no infrared beam is detected by infrared detectors 225 while the system is in the "search" mode, motor 264 is continuously energized thereby generating a continuously sweeping reference beam in the area of operation. In this manner, several workers at different locations in an enclosed structure or building may utilize the reference beam as it is continuously projected around the area.

It will thus be seen that the present invention provides a unique optical instrument tracking system which continuously and automatically maintains an optical instrument in alignment with an infrared emitting target. The present system is primarily comprised of solid state devices for ease of operation and maintenance, while providing continuously accurate operation. When used with a surveying system, the present system may eliminate required operators while yet providing extremely accurate operation. In case of an absence or interruption of the infrared signal, the present system enters into a search mode and continuously cycles until the beacon is activated and again detected. A delay circuit is provided in the system such that a brief interruption of the infrared signal does not switch the system into the search mode.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. An automatic elevation surveying system wherein a laser beam is aligned with a movable target comprising:
   a support pedestal having a vertically disposed member attached thereto,
   a laser beam source positioned within said member to project the laser beam in a vertical direction parallel to the axis of said member,
   a pivotal housing mounted on said support pedestal,
   prism means mounted in said housing with an input face of said prism means normal to the laser beam, whereby rotation of said prism means generates laser beams in a plane perpendicular to the original laser beam,
   a beacon attached to the movable target and operable to emit electromagnetic signals,
   electromagnetic signal detector means mounted to said housing,
   motor means for rotating said housing and responsive to the output of said detector means for pivoting said housing toward said beacon such that said laser beam is aligned with said movable target and such that said laser beam continually impinges said movable target permitting determination of a predetermined elevation at said movable target in response to the location of the impingement of said laser beam on said target.

2. The surveying system of claim 1 wherein said beacon includes structure for attachment to a surveying stadia rod, whereby the coherent beam from said laser continuously impinges on said stadia rod to visually indicate said predetermined elevation at the stadia rod.

3. The surveying system of claim 1 wherein said vertically disposed member attached to said support pedestal is a tubular member adapted to receive said laser beam source at the lower end of said tubular member.

4. The surveying system of claim 1 wherein said prism means is a pentagonally shaped prism having the optical characteristic that any beam of radiation that is incident on one of the prism faces will be emitted at exactly 90° to the incident beam.

5. The surveying system of claim 1 wherein said electromagnetic signals emitted from said beacon are infrared waves and said electrical signal detector means is an infrared wave detector.

6. The surveying system of claim 1 wherein said infrared detector means comprises:
   at least two infrared wave detectors,
   circuitry for determining the relative signal amplitudes detected by said detectors,
   means for generating an error signal in response to said relative signal amplitudes,
   said motor means being operable in response to said error signal for rotating said housing in a horizontal plane.

7. The surveying system of claim 6 wherein said circuitry comprises:
   means for summing the signal amplitudes from said detectors,
   means for subtracting the signal amplitudes from said detectors,
   means for differentiating the summed signal amplitudes, and
   means responsive to the differentiated signal and the subtracted signal to generate an error signal indicative of the position of said beacon.

8. The surveying system of claim 1 and further comprising:
   means for sensing a loss of infrared signal received by said detector means, and
   means responsive to said loss of infrared signal for continuously rotating said housing until an infrared signal is again detected.

9. The surveying system of claim 1 and further comprising:
   means for maintaining said laser beam in a level orientation.

10. An automatic tracking elevation surveying system for maintaining a laser beam in alignment with a movable target comprising:
    a portable beacon for being connected to said movable target and for emitting predetermined electromagnetic waves,
    a support pedestal operable to be located remote from said movable target having a vertically disposed tubular member attached thereto,
    a laser beam source positioned to the lower end of said tubular member to project the laser beam in a direction parallel to the axis of said tubular member,
    a pivotal housing mounted on said support pedestal,
    a pentaprism mounted in said housing with the input face of said pentaprism normal to the laser beam, whereby rotation of said pentaprism generates laser beams in a plane perpendicular to the original laser beam,
    means on said housing for detecting said predetermined electromagnetic waves,
    motor means for rotating said housing and responsive to said detecting means for pivoting said housing to maintain said laser beam in alignment with said movable target wherein said laser beam impinges upon said target to provide elevational information at said target,
    means in said housing for sensing the loss of said predetermined electromagnetic waves, and
    means responsive to the loss of said predetermined electromagnetic waves for operating said motor means to continuously rotate said housing until said detecting means again detects said predetermined electromagnetic waves.

11. The surveying system of claim 10 wherein said electromagnetic waves emitted from said beacon are infrared waves and said wave detector means is an infrared wave detector.

* * * * *